(12) United States Patent
Stefanziosa

(10) Patent No.: US 11,007,732 B2
(45) Date of Patent: May 18, 2021

(54) METHOD FOR PRODUCING A LOCALLY-REINFORCED PROFILE COMPONENT AND A COMPONENT PRODUCED USING SAID METHOD

(71) Applicant: Bayerische Motoren Werke Aktiengesellschaft, Munich (DE)

(72) Inventor: Clemens Stefanziosa, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 330 days.

(21) Appl. No.: 15/402,267

(22) Filed: Jan. 10, 2017

(65) Prior Publication Data
US 2017/0120546 A1    May 4, 2017

Related U.S. Application Data

(63) Continuation of application No. PCT/EP2015/066536, filed on Jul. 20, 2015.

(30) Foreign Application Priority Data

Sep. 1, 2014 (DE) ...................... 10 2014 217 372.8

(51) Int. Cl.
*B29C 70/88* (2006.01)
*B29C 70/44* (2006.01)
(Continued)

(52) U.S. Cl.
CPC .......... *B29C 70/887* (2013.01); *B29C 69/001* (2013.01); *B29C 70/342* (2013.01);
(Continued)

(58) Field of Classification Search
CPC ... B29C 70/887; B29C 70/462; B29C 69/001; B29C 70/342; B29C 70/446; B29L 2023/22
See application file for complete search history.

(56) References Cited

U.S. PATENT DOCUMENTS 4,483,731 A * 11/1984 Dohle .................... B29C 57/10
156/245
7,281,993 B2 * 10/2007 Oyama .............. A63B 53/0466
264/516
(Continued)

FOREIGN PATENT DOCUMENTS

CN         103702894 A      4/2014
DE         4423642      * 10/1995
(Continued)

OTHER PUBLICATIONS

DE 4423642 Machine Translation (EPO/Google) of Description.*
(Continued)

*Primary Examiner* — Christopher T Schatz
*Assistant Examiner* — Cynthia L Schaller
(74) *Attorney, Agent, or Firm* — Crowell & Moring LLP

(57) ABSTRACT

A method is provided for producing a locally-reinforced profile component. The method includes the following steps: providing a primary profile to be reinforced which is made of fiber-reinforced plastic; providing a secondary profile made of plastic for local reinforcement of the primary profile; arranging the secondary profile on an outer surface of the primary profile to create the profile component; heating the profile component (IO); integrally-bonded connecting of the primary profile and the secondary profile by applying pressure to an outer surface and simultaneous use of a counter pressure to apply pressure to an inner surface of the profile component.

13 Claims, 2 Drawing Sheets

(51) Int. Cl.
    *B29C 70/34* (2006.01)
    *B29C 69/00* (2006.01)
    *B29C 70/46* (2006.01)
    *B29L 23/00* (2006.01)
(52) U.S. Cl.
    CPC .......... B29C 70/446 (2013.01); B29C 70/462 (2013.01); *B29L 2023/22* (2013.01)

(56) References Cited

U.S. PATENT DOCUMENTS

| | | |
|---|---|---|
| 2006/0172101 A1 | 8/2006 | Hwang |
| 2010/0323200 A1 | 12/2010 | Beehag et al. |
| 2013/0276931 A1* | 10/2013 | Fernando ............ B29C 71/0009 138/137 |
| 2014/0137700 A1* | 5/2014 | Fiedler .................... F16C 7/026 74/579 R |
| 2014/0193192 A1 | 7/2014 | Eipper |
| 2015/0283756 A1* | 10/2015 | Flaig ..................... B29C 70/462 428/34.1 |

FOREIGN PATENT DOCUMENTS

| | | |
|---|---|---|
| DE | 10 2004 017 888 A1 | 11/2005 |
| DE | 102012018802 A1 * | 3/2013 |
| DE | 10 2012 018 804 A1 | 3/2014 |
| EP | 2 397 312 A1 | 12/2011 |
| EP | 2 465 665 A1 | 6/2012 |
| WO | WO 2012/099512 A1 | 7/2012 |

OTHER PUBLICATIONS

DE 4423642 Machine Translation (EPO/Google) of Claims.*
DE-102012018802-A1 Machine Translation of Description (EPO/Google).*
"WELD" definition from Merriam-Webster Dictionary (merriam-webster.com) (Year: 2020).*
"INTEGRAL" definition from Merriam-Webster Dictionary (merriam-webster.com) (Year: 2020).*
Chinese-language Office Action issued in counterpart Chinese Application No. 201580027049.9 dated Apr. 28, 2018 with English translation (thirteen (13) pages).
German-language Search Report issued in counterpart German Application No. 10 2014 217 372.8 dated Apr. 22, 2016 with English translation (11 pages).
International Search Report (PCT/ISA/210) issued in PCT Application No. PCT/EP2015/066536 dated Oct. 13, 2015 with English translation (6 pages).
German-language Written Opinion (PCT/ISA/237) issued in PCT Application No. PCT/EP2015/066536 dated Oct. 13, 2015 (5 pages).

* cited by examiner

METHOD FOR PRODUCING A LOCALLY-REINFORCED PROFILE COMPONENT AND A COMPONENT PRODUCED USING SAID METHOD

CROSS REFERENCE TO RELATED APPLICATIONS

This application is a continuation of PCT International Application No. PCT/EP2015/066,536, filed Jul. 20, 2015, which claims priority under 35 U.S.C. § 119 from German Patent Application No. 10 2014 217 372.8, filed Sep. 1, 2014, the entire disclosures of which are herein expressly incorporated by reference.

BACKGROUND AND SUMMARY OF THE INVENTION

The invention relates to a method for producing a locally reinforced profile component as well as to a correspondingly produced profile component.

For the production of profile components made of fiber-reinforced plastic, it is known, for example, to wind fiber mats made of glass fiber or carbon fiber around formative foam cores. The fiber material can either already be pre-impregnated with a matrix or will subsequently be subjected to an impregnating process. However, high degrees of deformation are difficult to implement in this manner.

From German patent document DE 10 2012 018 804 A1, a method is therefore known for producing a structural component with higher degrees of deformation for a motor vehicle, in which case a semi-finished fiber composite product is produced by sheathing a deformation hos. The semi-finished product is subsequently deformed by bending in order to achieve the high degrees of deformation. A bulging during the bending operation is prevented by simultaneously applying counter-pressure to the deformation hose.

The fiber composite component produced in this manner is produced as an endless component and has to be cut to the desired length. The fiber composite component therefore has a uniform type and thickness of material or wall thickness over its entire length, which wall thickness is determined by that point of the future component that is expected to be stressed the most. Less stressed sections therefore have the same thickness and are correspondingly overdimensioned.

From European patent document EP 2 465 665 A1, a method is known which provides a local sheathing of a structural component for its targeted reinforcement. For this purpose, prepregs are locally wound several times around a metallic hollow profile. However, the winding operation requires high expenditures and a subsequent hardening of the matrix.

It is therefore an object of the invention to provide a profile component, which at least reduces the above-mentioned disadvantages and can nevertheless be produced in a manner that is as simple as possible.

This and other objects are achieved by a method for producing a locally reinforced profile component according to embodiments of the invention as well as by a correspondingly provided profile component.

Accordingly, a method for producing a locally reinforced profile component includes the following action steps:

a) providing a primary profile that is made of fiber-reinforced plastic and is to be reinforced;

b) providing a secondary profile made of plastic for locally reinforcing the primary profile;

c) arranging the secondary profile on an exterior surface of the primary profile for generating the profile component;

d) heating the profile component;

e) integrally bonding the primary profile and the secondary profile by applying pressure to an exterior surface and simultaneously applying pressure to an interior surface of the profile component by way of counter-pressure.

The described method has the advantage that the primary profile as well as the secondary profile can be produced independently of the production of the future profile component and beforehand. It is therefore contemplated to, for example, produce the profiles by meter and cut them to predefined lengths.

In this case, the primary profile is made of fiber-reinforced plastic and is preferably already completely hardened. Depending on the usage, short fibers, long fibers or endless fibers are suitable for use as reinforcing fibers. Naturally, mixtures of these fibers can also be used. The fibers may include glass fibers, carbon fibers, aramid fibers, natural fibers or other fibers suitable for reinforcing the plastic material as well as mixtures of these fibers. The secondary profile includes a non-fiber-reinforced plastic or also a fiber-reinforced plastic.

Ideally, thermoplastic material is used with both profiles, in which case, the respective plastic material of the two profiles may deviate from one another. It is therefore contemplated to use the identical plastic material as the material for the secondary profile, but also a deviating plastic material, a deviating fiber length or a deviating fiber type with respect to the primary profile. Explicitly, all combinations of the above-mentioned alternatives are contemplated. The selection of different reinforcing fiber types and/or fiber lengths provides the special possibility of being able to adapt the degree of reinforcement in a targeted manner to the local requirements. Thus, the primary profile can be reinforced, for example, with long fibers, whereas the secondary profile is constructed in an endless-fiber-reinforced fashion.

In each case, the primary profile can be reinforced by the arrangement of the secondary profile at the point provided for this purpose by a local increase of the wall thickness. The arranging can first include a pure positioning of the secondary profile on an exterior surface of the primary profile. The actual connecting of the two profiles to form a common profile component takes place subsequently in that the two profiles are heated and are mutually pressed together by a pressure application acting upon the exterior surface of the profile component and a pressure application acting upon the interior surface.

Additional material, particularly adhesive or the like, is therefore not necessary. Instead, the heated plastic material of the primary profile is pressed together with the heated plastic material of the secondary profile in an integrally bonded manner. This means that the plastic materials bond with one another at least partially, preferably merge into one another, so that a one-piece profile component is obtained. In this manner, the secondary profile is connected with the primary profile in an integrally bonded manner and reinforces the latter at least locally.

The profile component therefore has a corresponding reinforcement preferably only at the location of the secondary profile, preferably at a location where high stress is to be expected. Locations where little stress is to be expected, in contrast, may have only the wall thickness of the primary profile without any additional reinforcement and, in comparison to locally reinforced locations, may be of a thin-walled construction. This construction allows a particularly simple production of a local reinforcement according to the requirements and simultaneously reduces material used as well as the entire component weight. It is understood that more than one secondary profile may be provided for the reinforcement of several locations on the primary profile.

Corresponding to a preferred embodiment, the step of heating the profile component includes a simultaneous pressure application to the interior surface of the profile component by way of a supporting pressure.

As a result of the supporting pressure, a collapsing, bulging or denting of the heated profile component or of the warming-up profile component can be prevented, when the firmness or stiffness of the material of the profile component decreases as the heating-up increases. For this purpose, the supporting pressure defines an internal pressure that is slightly increased with respect to an external pressure. As a function of the used plastic material, for achieving the supporting function, this internal pressure may amount, for example, to 0.5 to 5 bar, preferably approximately 1 bar.

Furthermore, the method can comprise the steps of:
a fluid-tight connecting of a first end of the primary profile with a fluid feeding line, and/or
a fluid-tight connecting of a second end of the primary profile with a fluid discharging line,
in order to feed and/or discharge a pressure fluid into the primary profile or out of the primary profile for generating a pressure application to the interior surface.

Accordingly, the application of pressure to the interior surface can take place by feeding a pressure fluid into the primary profile for generating the supporting pressure and/or the counter-pressure. Compressed air, water, oil or other fluids, for example, are suitable for use as pressure fluids. These are introduced by way of the fluid feeding line into an interior of the primary profile defined by the interior surface of the primary profile. Optionally, the fluid can be discharged again at the second end of the primary profile by way of the fluid discharge.

For example, a tightness between the respective end and the fluid feeding line or the fluid discharging line can be achieved by use of a matrix excess (plastic excess) of the primary profile and/or of a secondary profile arranged there. The excess may be provided either on an interior surface and/or on an exterior surface of the primary profile and/or of the secondary profile, so that sufficient tightness can be implemented and a deforming hose in the interior of the primary profile is therefore not required.

The fluid feeding line and/or the fluid discharging line may each have clamping jaws as coupling pieces for the connection with the primary profile and/or the secondary profile. On the side of the fluid feeding line and/or the fluid discharging line, the clamping jaws may preferably have a valve for regulating the through-flow.

Also in an optional manner, the temperature of the pressure fluid can be regulated. In particular, the pressure fluid can be heated or cooled, in order to correspondingly heat or cool the profile component during the pressure application. The step of heating the profile component can particularly take place by using a correspondingly heated pressure fluid.

In addition, the method preferably comprises a step of arranging the profile component in a mold, the application of pressure to the exterior surface of the profile component taking place by way of the molding tool. This means that, for connecting the secondary profile with the primary profile, the profile component is placed in the molding tool together with the primary profile and is pressed. The generated counter-pressure may, for example, be less than 500 bar, preferably less than 200 bar, particularly preferably less than 100 bar.

In this case, the profile component can either already be heated outside the molding tool and/or in the molding tool itself. An external heating can be implemented, for example, by use of an external heat source, particularly a non-contact heat radiator, as, for example, a UV or infrared heat radiator. In addition or as an alternative, the above-described introduction of heated pressure fluid for heating the profile component is contemplated.

In addition, the application of pressure to the exterior surface of the profile component by the molding tool may include a reshaping of the profile component. This means that not only a connecting of the primary profile with the secondary profile takes place in the molding tool, but the entire profile component can be formed into a new shape. Here, the application of pressure to the interior surface can—as described—be used as counter-pressure against a denting or bulging of the primary profile. Correspondingly, a component with high degrees of deformation can be produced in a particularly simple manner.

According to preferred embodiments, the secondary profile has a C-shaped or U-shaped cross-section or a cross-section that is closed in a circumferential direction. In addition, the primary profile may have a cross-section that is closed in a circumferential direction.

If the cross-section of the secondary profile has a C- or U-shaped design, the secondary profile can be arranged on the primary profile such that the secondary profile reaches at least partially around the primary profile by means of the legs of the C- or U-shape. In the case of a closed cross-section of the secondary profile, the latter forms a hollow profile, in which case the primary profile is arranged in the interior of the closed cross-section, the closed cross-section even reaching completely around it. Depending on the further development of the cross-section, the secondary profile can be fitted laterally or transversely with respect to a longitudinal direction of the primary profile onto the primary profile or can be pushed onto the primary profile in its longitudinal direction. The longitudinal direction is preferably identical with the extrusion direction of the profile.

A profile of the primary profile and/or of the secondary profile that is closed in the circumferential direction particularly is a hollow profile whose wall, in a sectional view perpendicular to the longitudinal dimension of the profile, is constructed continuously and without any interruption. The cross-section itself may have any shape or correspond to the shape of the future component. In particular, round, oval, bent and polygonal cross-sections are preferred. Optionally, the corners of the polygonal cross-sections may be rounded. For example, the primary profile and the secondary profile may have the same cross-sectional shape.

However, according to an embodiment, an internal cross-section of the secondary profile is identical to or larger than an external cross-section of the primary profile. It can thereby be ensured that the secondary profile can be fitted onto the primary profile or can be pushed on the latter in the longitudinal direction.

In addition, the step of arranging the secondary profile on the primary profile can include a local fixing of the secondary profile on the primary profile. This can take place particularly by use of a connecting device, an external holding tool and/or an at least local integrally bonded connection. It can thereby be prevented that, during the subsequent working steps, the secondary profile detaches from the primary profile or is displaced with respect to the desired position before both profiles are integrally bonded with one another.

Furthermore, the method can comprise a step for arranging a deformation hose in the interior of the primary profile for applying pressure to the interior surface by means of counter-pressure and/or supporting pressure. It is therefore not the wall of the primary profile itself that is used as a receptacle for the pressure fluid, but the deformation hose is arranged in the interior of the primary profile and is filled with pressure fluid so that it supports itself on the wall or the interior surface. Correspondingly, the pressure fluid acts upon the interior surface of the primary profile by way of a wall of the deformation hose.

As indicated above, the primary profile and/or the secondary profile may be produced by the meter. The method correspondingly comprises a step of cutting the primary profile and/or the secondary profile to a respectively predefined length. The advantage is a particularly simple production by processes for the continuous semi-finished product manufacturing, for example, as an extruded profile or by means of pultrusion, particularly as a hollow profile. In addition, the production of the profiles can be uncoupled with respect to space and time from the discontinuous processing to obtain the profile component, so that a cycle time for the actual profile component will not be impaired by the production of the two profiles.

The method is suitable for convex as well as concave geometries. A further processing by means of the following injection molding processes is also contemplated in order to mount, for example, function elements, such a ribs, inserts or flanges, on the profile component. Since a core system is no longer necessary, it is additionally contemplated to provide a later filling of the profile component with foam for improving crash characteristics or to utilize the corresponding cavities of the profile component for the protected line routing and/or cable routing.

Furthermore, a profile component is disclosed which is produced by the described method. The profile component may, for example, be a side member, a cross member, a seat cross member, a rear cross member, a front end member, a roof frame, an engine mount, a crash profile, a control arm and/or a stabilizer of the motor vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
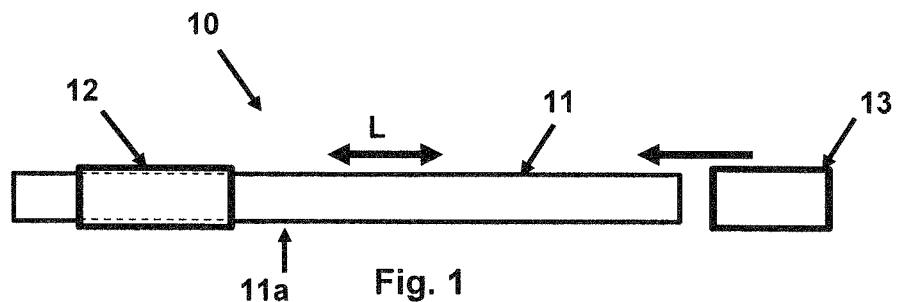
FIG. 1 is a diagrammatic view of a first step of a process according to the description.

FIG. 1 illustrates a first step of a process for producing a locally reinforced profile component 10. Accordingly, a primary profile 11 of a fiber-reinforced plastic material that is to be reinforced is provided first. Likewise, two secondary profiles 12, 13 of plastic or also of fiber-reinforced plastic are provided for the local reinforcement of the primary profile 11.

The following description includes the use of two secondary profiles for reinforcing the primary profile at two different locations only for the purpose of improving clarity. However, it is understood that the method can be implemented also with only one secondary profile or with a plurality of secondary profiles in an analogous manner.

Both secondary profiles 12, 13 are arranged on an exterior surface 11a of the primary profile 11. In FIG. 1, the second secondary profile 13 is provided in order to be pushed onto the primary profile 11 in the longitudinal direction L. For this purpose, a respective internal cross-section of the secondary profile 12, 13 is identical with or larger than an external cross-section of the primary profile 11. The longitudinal direction L extends in the axial dimension direction of the primary profile 11. The two secondary profiles 12, 13 have, for example, a C- or U-shaped cross-section or, as a hollow profile, a cross-section (in each case not shown) that is closed in a circumferential direction. In contrast, the primary profile is further developed as a hollow profile (also not shown) with a cross-section closed in a circumferential direction.

Figure 2:
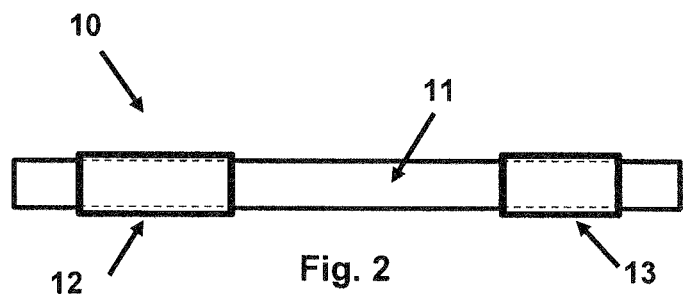
FIG. 2 is a diagrammatic view of a second step.

FIG. 2 shows the pushed-on condition, in which both secondary profiles 12, 13 are arranged on the primary profile 11 at the respective locations to be reinforced. This arrangement forms the profile component 10 to be processed further. In order to prevent a shifting of the two secondary profiles 12, 13 with respect to the primary profile 11, a local fixing (which is not shown) of the secondary profiles 12, 13 on the primary profile 11 can be carried out. This can take place particularly by use of a connection device, an external holding tool and/or an at least local integrally bonded connection.

Figure 3:
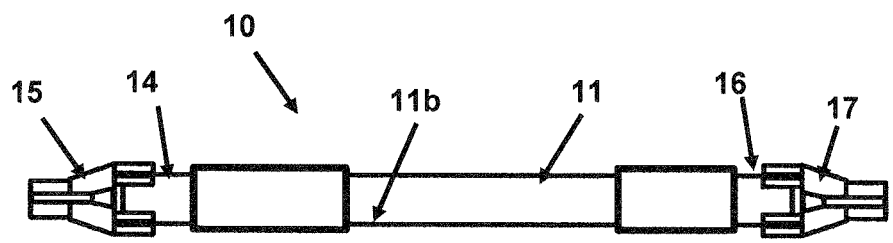
FIG. 3 is a diagrammatic view of a third step.

FIG. 3 illustrates a fluid-tight connecting of a first end 14 of the primary profile 11 with a fluid feeding line 15 and a fluid-tight connecting of a second end 16 of the primary profile 11 with a fluid discharging line 17. A pressure fluid D can thereby be introduced into the primary profile 11 for generating a pressure application to the interior surface 11b at the first end 14 and can be discharged at the second end 16 (compare FIG. 4).

Figure 4:
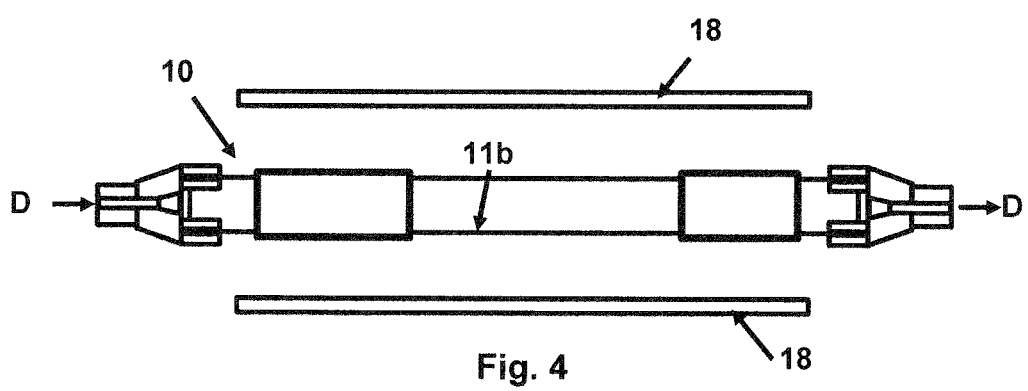
FIG. 4 is a diagrammatic view of a fourth step.
Figure 5:
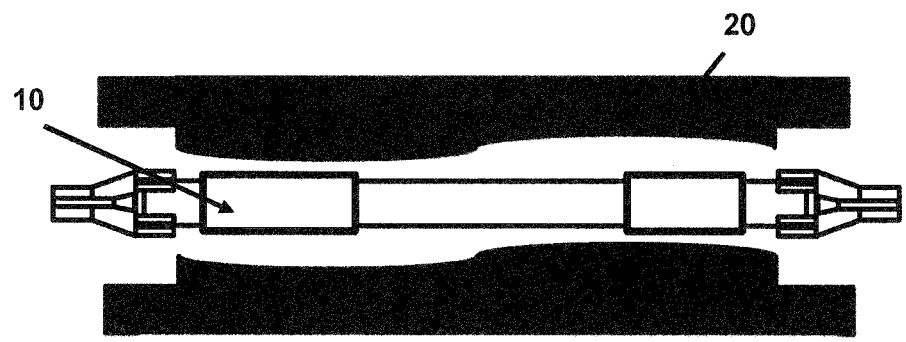
FIG. 5 is a diagrammatic view of a fifth step.

FIG. 4 illustrates the subsequent step of heating the profile component 10. As an example, external heat sources 18, particularly infrared lamps, can be provided for this purpose. During the heating of the profile component 11, preferably a simultaneous application of pressure to the interior surface 11b of the profile component 11 can take place by way of a supporting pressure, in that pressure fluid D is introduced into the primary profile. By way of an optional heating of the introduced pressure fluid D, the heating of the profile component 10 can be carried out as an alternative or in addition.

Subsequently, the heated profile component 10 is placed in a molding tool 20 having an upper tool and a lower tool which is movable relative to the upper tool. The application of pressure to the exterior surface of the profile component takes place by way of the molding tool. For this purpose, the molding tool 20 is closed after the insertion of the profile component 10 and the latter is pressed.

According to an alternative sequence (not shown), the profile component 10 can first be placed in the molding tool 20 and can also be heated there by way of an external heat source, a heat source integrated in the molding tool or the possibly heated pressure fluid D.

Figure 6:
FIG. 6 is a diagrammatic view of a sixth step of the process.

As illustrated in FIG. 6 by way of the closed molding tool 20, an integrally bonded connection of the primary profile 11 and of the two secondary profiles 12, 13 thereby takes place via the application of pressure to an exterior surface and a simultaneously pressure application to an interior surface of the profile component 10 by way of a counter-pressure. In addition, the molding tool 20 is further developed such that the pressure application to the exterior surface of the profile component 10 by way of the molding tool 20 additionally causes a deforming of the entire profile component 11. The interior surface of the profile component 10 is formed by the interior surface 11b of the primary profile 11. In contrast, the exterior surface of the profile component 10 is defined by the exterior surface 11a as well as at the locally reinforced locations by exterior surfaces of the secondary profiles 12, 13.

It can therefore be made into a required component shape. The profile component 10 may, for example, be a side member, a cross member, a front end member, a control arm and/or a stabilizer of a motor vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a locally reinforced profile component, the method comprising the acts of:
    providing a primary profile that is made of fiber-reinforced plastic and is to be reinforced;
    providing a secondary profile made of plastic for locally reinforcing the primary profile;
    arranging the secondary profile on an exterior surface of the primary profile for generating the profile component;
    heating the profile component; and
    integrally bonding the primary profile and the secondary profile by applying pressure to an exterior surface and simultaneously applying pressure to an interior surface of the profile component as a counter-pressure, wherein the primary profile has been completely hardened before the integrally bonding and wherein the pressure is applied via either a deformation hose in the interior of the primary profile, or a fluid fed into a first end of the primary profile via a fluid-tight connection, for applying pressure to the interior surface as the counter pressure and/or a supporting pressure.

2. The method according to claim 1, wherein
    the act of heating the profile component comprises a simultaneous application of pressure to the interior surface of the profile component as a supporting pressure.

3. The method according to claim 1, wherein the method further comprises the acts of:
    a fluid-tight connecting of the first end of the primary profile with a fluid feeding line, and/or
    a fluid-tight connecting of a second end of the primary profile with a fluid discharging line,
    whereby a pressure fluid is feedable or dischargeable into the primary profile or out of the primary profile for generating the pressure application to the interior surface.

4. The method according to claim 3, wherein
    a tightness between the first end and the fluid feeding line and/or between the second end and the fluid discharging line is achieved by a matrix excess of the primary profile on the interior surface and/or on the exterior surface of the primary profile.

5. The method according to claim 1, wherein the method further comprises the act of:
    arranging the profile component in a molding tool, the application of pressure to the exterior surface of the profile component taking place by the molding tool.

6. The method according to claim 5, wherein
    the application of pressure to the exterior surface of the profile component by the molding tool in addition comprises a deforming of the profile component.

7. The method according to claim 1, wherein
    the secondary profile has a C-shaped or U-shaped cross-section or a cross-section that is closed in a circumferential direction, and
    the primary profile has a cross-section that is closed in a circumferential direction.

8. The method according to claim 7, wherein
    an interior cross-section of the secondary profile is identical with or larger than an exterior cross-section of the primary profile.

9. The method according to claim 1, wherein
    an interior cross-section of the secondary profile is identical with or larger than an exterior cross-section of the primary profile.

10. The method according to claim 1, wherein the act of arranging the secondary profile on the primary profile comprises a local fixing of the secondary profile on the primary profile, by a connecting device, an external holding tool and/or an at least local integrally bonded connection.

11. The method according to claim 1, wherein
    the primary profile and/or the secondary profile are produced by the meter, and
    the method further comprises the act of:
    cutting the primary profile and/or the secondary profile to a respectively predefined length.

12. A profile component produced according to the method of claim 1.

13. The profile component according to claim 12, wherein the profile component is a side member, a cross member, a front end member, a roof frame, an engine mount, a crash profile, a control arm and/or a stabilizer of a motor vehicle.

* * * * *